(12) United States Patent
Ozawa et al.

(10) Patent No.: US 7,777,132 B2
(45) Date of Patent: Aug. 17, 2010

(54) ELECTRICAL CONNECTION BOX

(75) Inventors: Keisuke Ozawa, Kakegawa (JP);
Tomohiro Sugiura, Kakegawa (JP);
Katsuhiro Kubota, Kakegawa (JP);
Katsuyoshi Kobayashi, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 405 days.

(21) Appl. No.: 11/969,432

(22) Filed: Jan. 4, 2008

(65) Prior Publication Data
US 2008/0238271 A1 Oct. 2, 2008

(30) Foreign Application Priority Data
Jan. 10, 2007 (JP) .............................. 2007-002381

(51) Int. Cl.
*H02G 3/08* (2006.01)
(52) U.S. Cl. .............................. 174/50; 174/58; 174/60; 174/64; 174/135; 248/906; 439/353
(58) Field of Classification Search .................... 174/50, 174/58, 60, 64, 135; 439/353, 535, 341, 439/376, 357; 248/906; 220/4.02
See application file for complete search history.

(56) References Cited

U.S. PATENT DOCUMENTS

| 7,569,770 | B2 * | 8/2009 | Remmert et al. | 174/50 |
| 7,608,780 | B2 * | 10/2009 | McCarthy | 174/50 |
| 7,622,674 | B2 * | 11/2009 | Kanamaru et al. | 174/50 |
| 7,626,118 | B1 * | 12/2009 | Capozzi | 174/50 |
| 7,633,008 | B2 * | 12/2009 | Kanou | 174/50 |

FOREIGN PATENT DOCUMENTS

| JP | 09-163552 A | 6/1997 |
| JP | 2001-078329 A | 3/2001 |
| JP | 2005-176539 A | 6/2005 |
| JP | 2006-187052 A | 7/2006 |

* cited by examiner

*Primary Examiner*—Dhiru R Patel
(74) *Attorney, Agent, or Firm*—Sughrue Mion, PLLC

(57) ABSTRACT

An electrical connection box includes: a body; a mounting member which is attached to the body; a shaft portion which is provided on the mounting member; and a shaft receiving portion which is provided on the body and receives the shaft portion rotatably. A first rib is formed on one of the shaft portion and the shaft receiving portion. When the mounting member is attached to the body, the first rib abuts against the other of the shaft portion and the shaft receiving portion.

4 Claims, 11 Drawing Sheets

ELECTRICAL CONNECTION BOX

BACKGROUND

This invention relates to an electrical connection box to be mounted on a vehicle or the like, and more particularly to an electrical connection box in which a body and a mounting member to be mounted on the body are releasably connected together through a hinge.

An electrical connection box (also called a junction block) includes a body including a housing having a plurality of electronic parts (such for example as fuses, relays, etc.) received therein, and an electronic control unit (ECU) (serving as a mounting member) having a control circuit for controlling the plurality of electronic parts.

Generally, the above electrical connection box is constructed such that the electronic control unit is incorporated in the housing of the body (see, for example, Patent Literature 1). In recent years, however, in order to enhance the efficiency of maintenance in the event of a malfunction of the control circuit or the electronic control unit and also to reduce the cost required for exchanging parts, there have been used electrical connection boxes of the type in which an electronic control unit having a control circuit received in a housing separate from a housing of a body is fixedly attached to the body by fixing means such as a lock, a hinge, screws or others (see, for example, Patent Literature 2).

In the electrical connection box disclosed in Patent Literature 2, the electronic control unit and the body are fixed to each other by a hinge and locks so that the former can be easily attached to the body with less time and labor. This hinge includes a hook formed at one end of the electronic control unit, and a hook receiving recess which is formed at one end of the body such that the hook can be rotatably and releasably received in this hook receiving recess. The lock includes a lock arm formed at the other end of the electronic control unit, and a lock arm insertion hole which is formed in the other end of the body such that the lock arm can be engaged in this lock arm insertion hole. In this electrical connection box, the hook is engaged in the hook receiving recess, and then the electronic control unit is rotatably moved toward the body about the hook, so that the lock arm is engaged in the lock arm insertion hole, thereby fixing the electronic control unit to the body.

[Patent Literature 1] JP-A-2006-187052
[Patent Literature 2] JP-A-9-163552

However, in the electrical connection box disclosed in the above Patent Literature 2, a predetermined clearance is to be formed between the electronic control unit and the body, taking into consideration problems with the mounting operation and dimensional irregularities inevitably developing in the production. Therefore, there has been encountered a problem that after the electronic control unit is attached to the body, a relative shaking movement develops between the two.

Furthermore, particularly in the electrical connection box disclosed in the above Patent Literature 2, the electronic control unit, while rotatably moved about the hinge, is mounted onto the body, and therefore it is necessary to provide the larger clearance as compared with the type of electrical connection box in which an electric control unit is attached to a body while the two are moved linearly toward each other, and this has invited a problem that the shaking movement is large because of this increased clearance.

The above problem can be dealt with, for example, by fixing the electronic control unit and the body together by screws after the electronic control unit is attached to the body. In this case, however, there arises another problem that the number of component parts and the time and labor required for the attaching operation increase.

SUMMARY

It is therefore an object of this invention to provide an electrical connection box in which a mounting member to be releasably attached to a body can be easily attached to the body, and also a relative shaking movement between the mounting member and the body can be prevented after the mounting member is attached to the body.

The above object has been achieved by an electrical connection box of the invention which includes:

a body;
a mounting member which is attached to the body;
a shaft portion which is provided on the mounting member; and
a shaft receiving portion which is provided on the body and receives the shaft portion rotatably,
wherein a first rib is formed on one of the shaft portion and the shaft receiving portion; and
wherein when the mounting member is attached to the body, the first rib abuts against the other of the shaft portion and the shaft receiving portion.

Preferably, the first rib is formed on the shaft portion, and a second rib is formed on the shaft receiving portion.

Preferably, the first rib extends along a surface of the shaft portion, the second rib extends along a surface of the shaft receiving portion, and the first rib and the second rib intersect with each other when the mounting member is attached to the body.

Preferably, the first rib extends along an axis of rotation of the shaft portion.

In the invention, the body and the mounting member are rotatably and releasably connected together at their one ends through a hinge, and the hinge includes the shaft portion provided on the mounting member, and the shaft receiving portion which is provided on the body and receives the shaft portion in a manner to allow the rotation of the shaft portion. Therefore, the shaft portion is located in the shaft receiving portion, and then the mounting member is rotatably moved toward the body about the shaft portion, and merely by doing so, the mounting member can be easily attached to the body. Further, the rib is formed on at least one of the shaft portion and the shaft receiving portion, and projects toward the other of the shaft portion and the shaft receiving portion, and when the mounting member is attached to the body, the rib abuts against the other of the shaft portion and the shaft receiving portion to prevent a relative shaking movement between the shaft portion and the shaft receiving portion. Therefore, there can be provided the electrical connection box in which the mounting member can be easily attached to the body, and also a relative shaking movement between the mounting member and the body can be prevented after the mounting member is mounted on the body. Furthermore, since such shaking movement can be prevented, a clearance to be formed between the body and the mounting member so as to enhance the efficiency of the attaching operation can be set to a larger size, and therefore the mounting member can be more easily attached to the body.

In the invention, the ribs are formed respectively on the shaft portion and the shaft receiving portion, and extend respectively along the outer surfaces of the shaft portion and the shaft receiving portion, and the ribs are arranged so as to intersect each other when the mounting member is attached to the body. Therefore, the ribs bite into each other, and are fixed to each other, and therefore in addition to a shaking movement in the direction of projecting of the ribs, a shaking movement in a longitudinal direction of the rib on the shaft portion as well as a shaking movement in a longitudinal direction of the rib on the shaft receiving portion can be absorbed.

In the invention, the rib formed on the shaft portion extends along the axis of rotation of the shaft portion. Furthermore, the rib on the shaft portion can be brought into abutting engagement with the rib on the shaft receiving portion simultaneously when the mounting member is attached to the body, and therefore these ribs will not prevent the rotation of the shaft portion.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION

Figure 1:
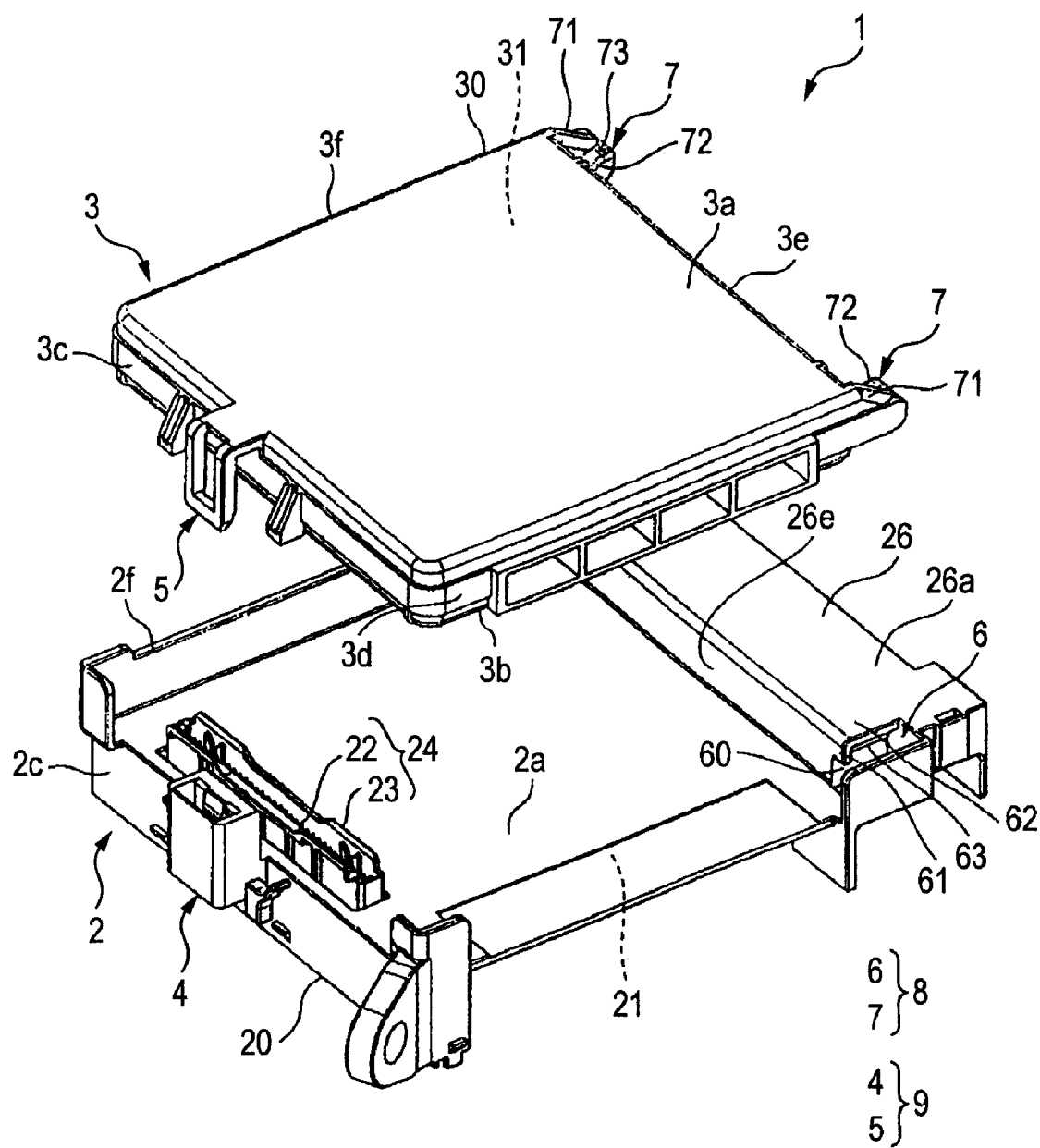
FIG. 1 is a perspective view of one preferred embodiment of an electrical connection box of the present invention, showing a condition in which a body and a mounting member are separated from each other.
Figure 2:
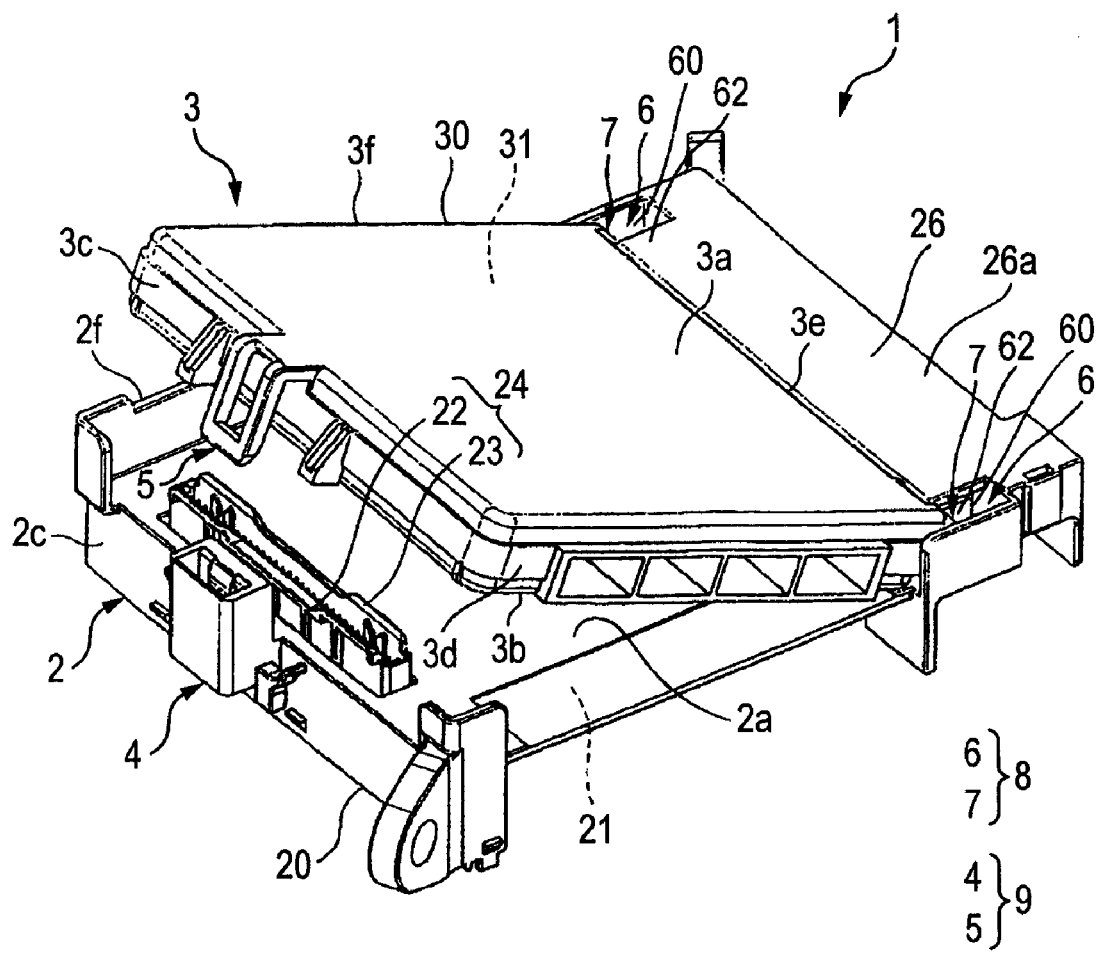
FIG. 2 is a perspective view of the electrical connection box of FIG. 1, showing the process of attaching the mounting member to the body.

One preferred embodiment of an electrical connection box of the present invention will now be described with reference to FIGS. 1 to 14. The electrical connection box 1 of this embodiment is fixed to a panel forming a vehicle body of an automobile or other portion of the automobile, and various electronic equipments mounted on the automobile are electrically connected together in a predetermined pattern through this electrical connection box 1.

As shown in FIGS. 1 to 4, the electrical connection box 1 includes a body 2, and an electronic control unit (hereinafter referred to as "ECU" which is an abbreviation of Engine Control Unit) 3 serving as a mounting member to be attached to the body 2, hinges 8 rotatably and releasably connecting the body 2 and the ECU 3 together, a fixing portion 9 for fixing the body 2 and the ECU 3 to each other.

The body 2 includes a housing 20 made of an insulative synthetic resin, and a printed circuit board 21 (see FIGS. 6 to 8) mounted on the housing 20.

The housing 20 includes a mounting surface portion 2a in the form of a square plate, a block-like interconnecting portion 26 formed integrally at one end of the mounting surface portion 2a (that is, one outer edge of the mounting surface portion 2a), and an upstanding wall 2c formed on and extending perpendicularly from the other end of the mounting surface portion 2a (that is, that outer edge of the mounting surface portion 2a remote from the interconnecting block 26), and a guide wall 2f formed on and extending upwardly perpendicularly from that outer edge of the mounting surface portion 2a lying between the interconnecting portion 26 and the upstanding wall 2c.

The connecting portion 26 includes a surface 26e extending in a direction perpendicular to the mounting surface portion 2a and intersecting the one end of the mounting surface portion 2a, and a surface 26a extending from that end of the surface 26e disposed above the mounting surface portion 2a (in FIG. 1) in a direction parallel to the mounting surface portion 2a.

The guide wall 2f extends upwardly (in FIG. 1) from the outer edge of the mounting surface portion 2a, that is, in a direction perpendicular to the mounting surface portion 2a.

Figure 6:
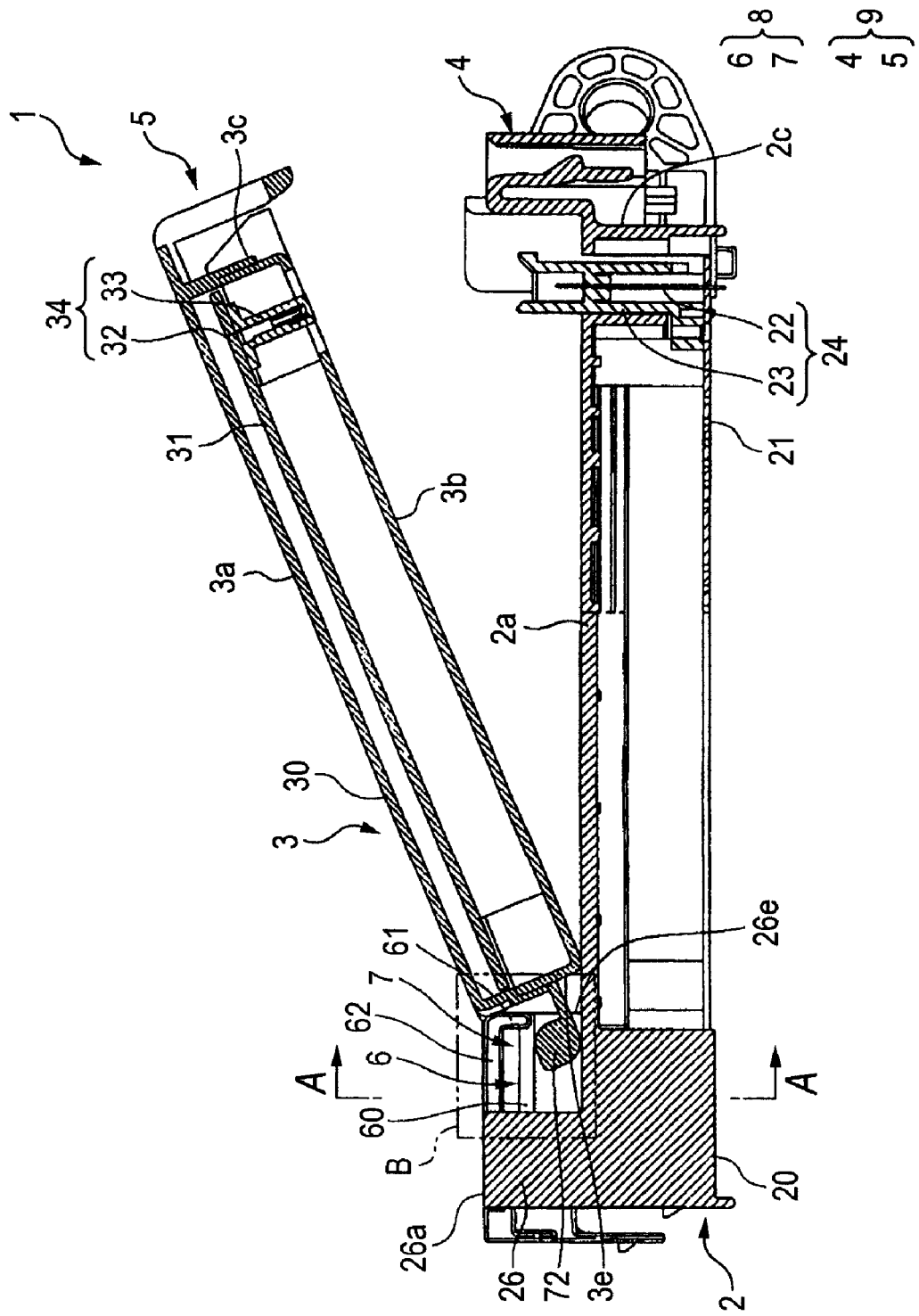
FIG. 6 is a cross-sectional view of the electrical connection box of FIG. 2 taken along the line K-K of FIG. 4.
Figure 7:
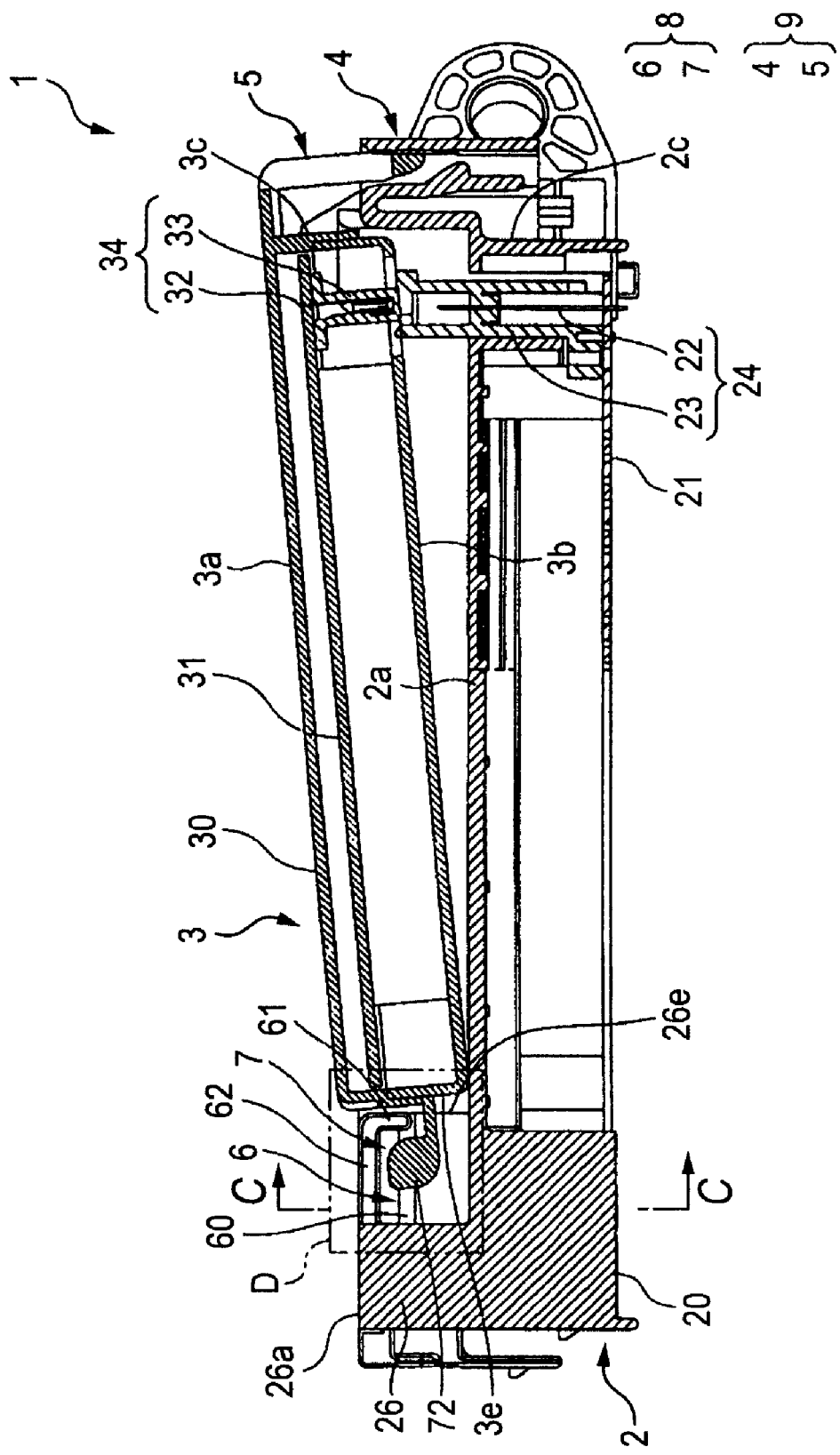
FIG. 7 is a cross-sectional view of the electrical connection box showing a condition in which the mounting member is further moved from its position of FIG. 6 toward the body.
Figure 8:
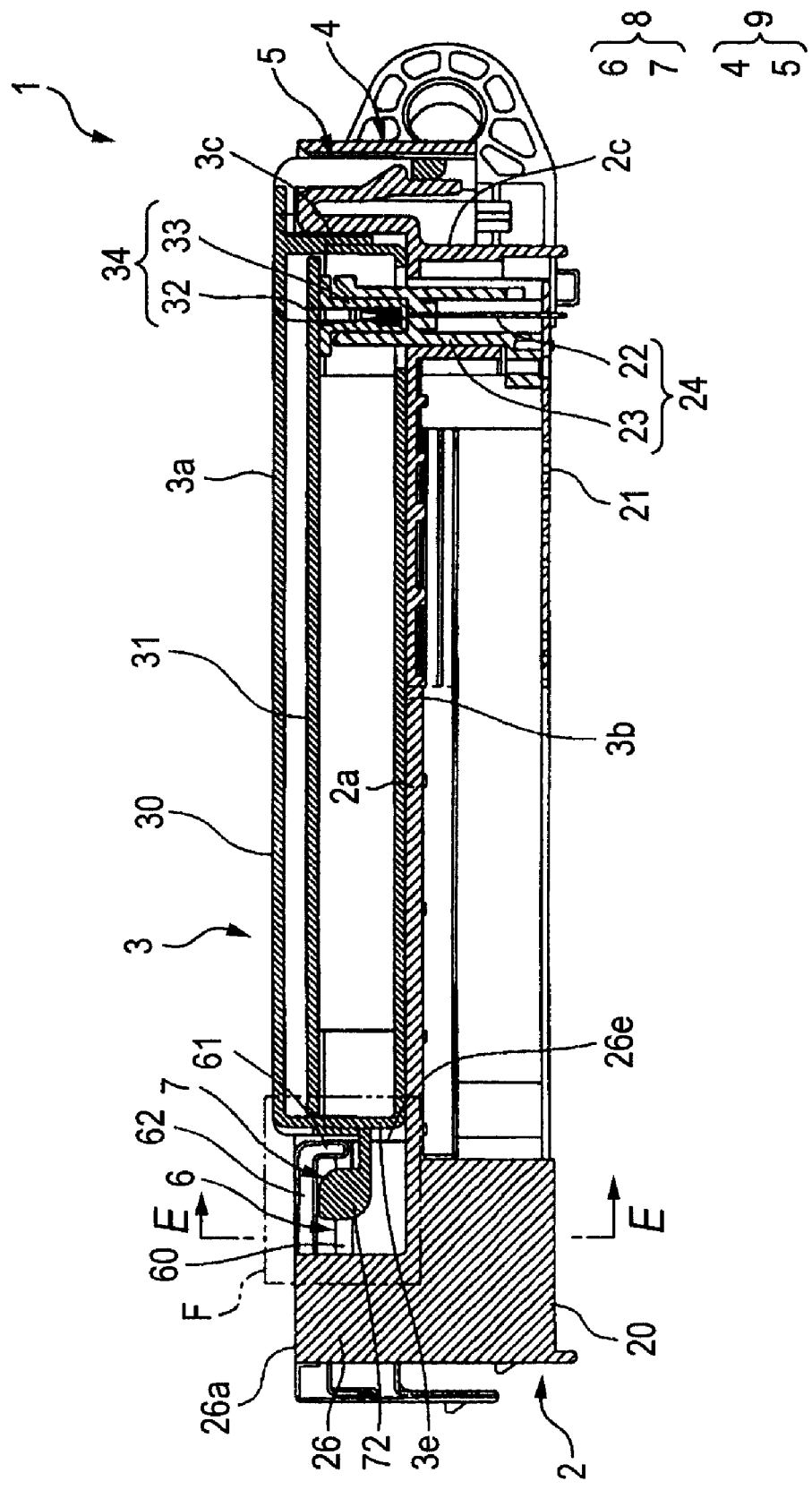
FIG. 8 is a cross-sectional view taken along the line K-K of FIG. 4.
Figure 9:
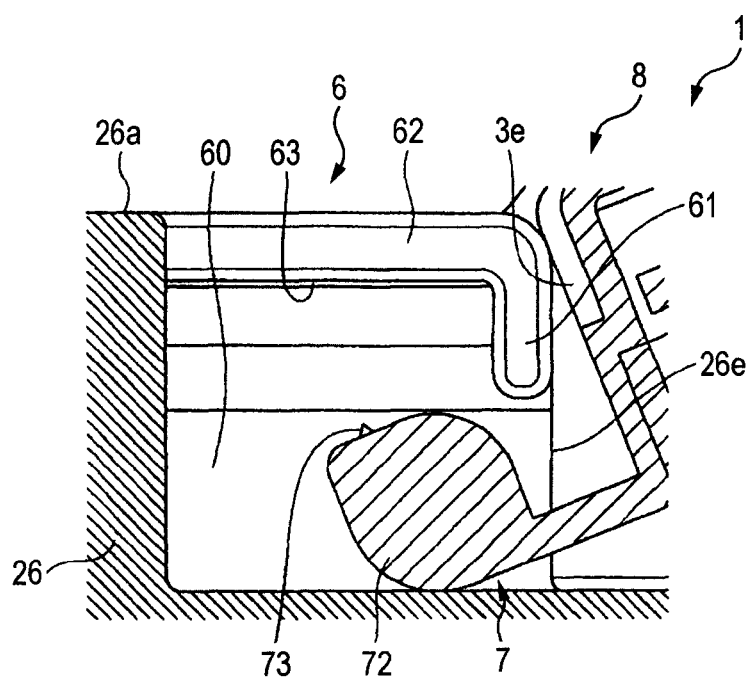
FIG. 9 is an enlarged cross-sectional view showing a portion B of the electrical connection box shown in FIG. 6.
Figure 10:
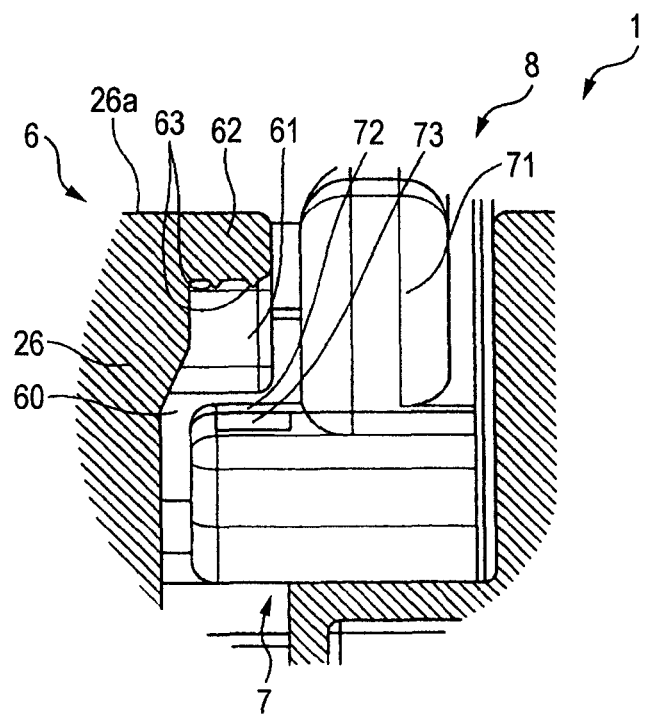
FIG. 10 a cross-sectional view taken along the line A-A of FIG. 6.

The printed circuit board 21 is a well-known printed circuit board having relays and fuses mounted thereon. As shown in FIGS. 6 to 8, this printed circuit board 21 is disposed under the mounting surface portion 2a (in FIG. 6) in parallel to the mounting surface portion 2a. The printed circuit board 21 has a connector 24 for electrically connecting this printed circuit board 21 to a printed circuit board 31 (described later) of the ECU 3.

The connector 24 includes bar-like male terminals 22 which are connected to a circuit pattern formed on the printed circuit board 21 and extend upwardly toward the mounting surface portion 2a, and a synthetic resin-made connector housing 23 of a tubular shape surrounding the plurality of the male terminals 22. This connector 24 passes through a through hole formed through the mounting surface portion 2a such that part of the connector 24 projects upwardly (in FIG. 6) beyond the mounting surface portion 2a.

The ECU 3 includes a housing 30 made of an insulative synthetic resin, and the printed circuit board 31 (see FIGS. 6 to 8) received within the housing 30.

The housing 30 includes an upper wall 3a in the form of a square plate generally identical in shape to the mounting surface portion 2a, side walls 3c, 3d, 3e and 3f extending upwardly respectively from four side (or outer) edges of the upper wall 3a, and a lower wall 3b disposed in opposed, spaced relation to the upper wall 3a and integrally connected to lower edges of the side walls 3c, 3d, 3e and 3f remote from the upper wall 3a. Namely, this housing 30 has a flat outer shape, and has an internal space for receiving the printed circuit board 31 therein. The housing 30 is attached to the body 2 in such a manner that the lower wall 3b abuts against the mounting surface portion 2a and that the side wall 3f abuts against the guide wall 2f (see FIGS. 3 and 4).

The printed circuit board 31 is a well-known printed circuit board having a control circuit for controlling the relays and fuses mounted on the printed circuit board 21 of the body 2. As shown in FIGS. 6 to 8, the printed circuit board 31 is received within the housing 30 in parallel relation to the upper wall 3a and the lower wall 3b. The printed circuit board 31 has a connector 34 for electrically connecting this printed circuit board 31 to the printed circuit board 21 of the body 2.

The connector 34 includes tubular female terminals 32 which are connected to a circuit pattern formed on the printed circuit board 31 and extend downwardly toward the lower wall 3b, and a synthetic resin-made connector housing 33 of a tubular shape receiving the female terminals 32. A through hole is formed through that portion of the lower wall 3b corresponding to the connector 34, and the connector 24 of the body 2 is fitted to the connector 34 through this through hole. In the present specification, the fitting of these connectors means that the male terminals 22 are inserted respectively into the female terminal 32 to be electrically connected thereto.

Each of the hinges 8 includes a rotation portion 7 formed at one end of the ECU 3, and a shaft receiving portion 6 formed at one end of the body 2.

Figure 5:
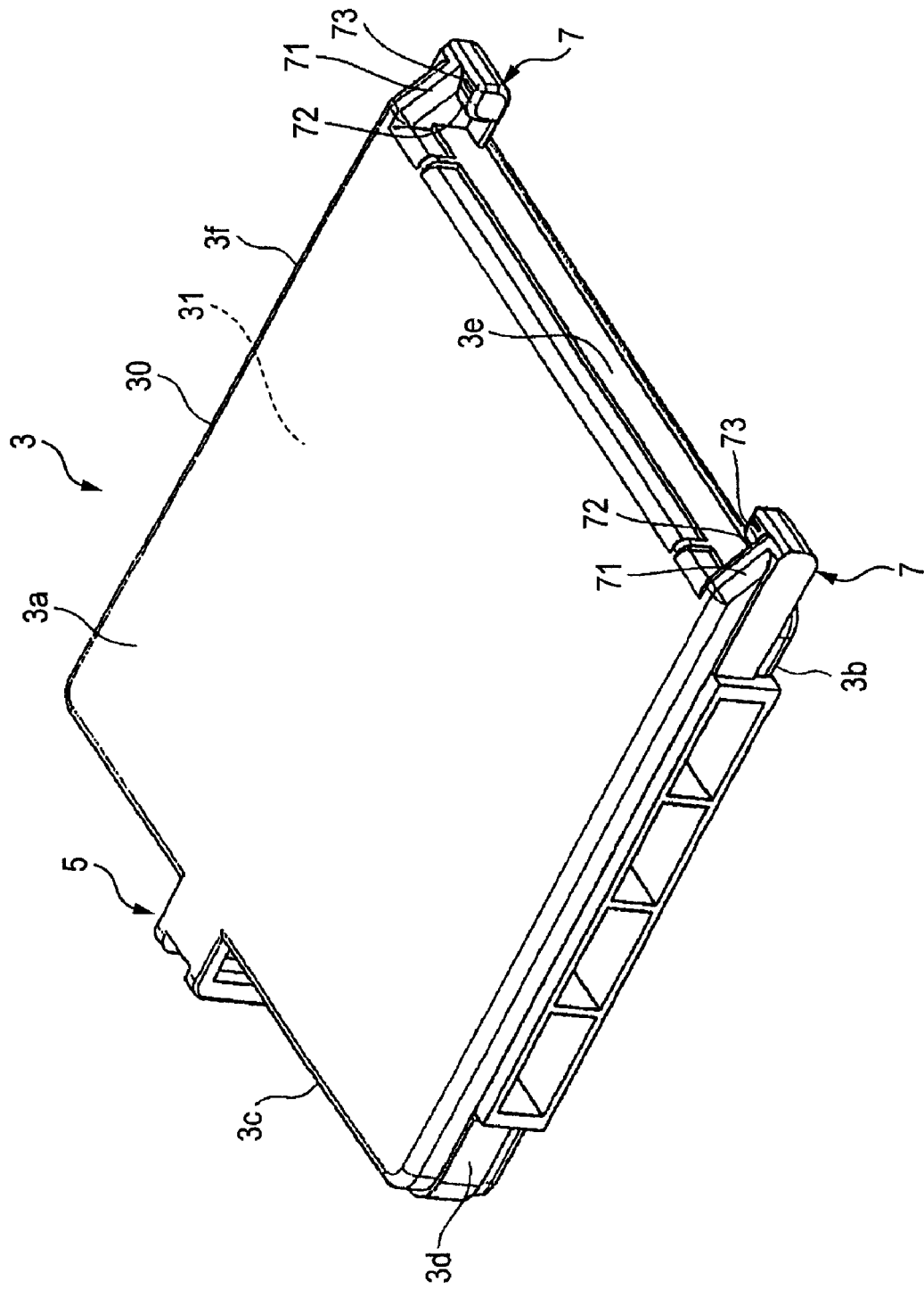
FIG. 5 is a perspective view showing the mounting member of the electrical connection box of FIG. 1.

As shown in FIG. 5, the rotation portion 7 includes a shaft leg 71 formed on the side wall 3e and extending in a direction away from the side wall 3c, and a shaft portion 72 formed at a distal end of the shaft leg 71 (remote from the side wall 3e) and extending along a direction of opposing of the side wall 3f and the side wall 3d to each other. The two rotation portions 7 are provided at the ECU 3, and one of these rotation portions 7 is provided at one longitudinal end of the side wall 3e disposed immediately adjacent to the side wall 3d, while the other rotation portion 7 is provided at the other longitudinal end of the side wall 3e disposed immediately adjacent to the side wall 3f. The shaft portions 72 of the pair of rotation portions 7 extend toward each other. Namely, the side wall 3e forms one end of the ECU 3 serving as the mounting member, while the side wall 3c forms the other end of the ECU 3.

As shown in FIGS. 1 and 6, the shaft receiving portion 6 includes a receiving recess 60 formed at the interconnecting portion 25 and receiving the rotation portion 7 therein, and a first limitation wall 61 and a second limitation wall 62 which prevent the shaft portion 72 from being disengaged from the receiving recess 60 during the rotative movement of the rotation portion 7. The two shaft receiving portions 6 are provided at the interconnecting portion 26 of the body 2, and are spaced from each other, and are disposed respectively at the opposite end portions of the interconnecting portion 26 so as to correspond respectively to the pair of rotation portions 7.

The receiving recess 60 is a cavity extending from the surface 26e of the interconnecting portion 26 in a direction away from the upstanding wall 2c. This receiving recess 60 is open to both of the surface 26e and the surface 26a.

The first limitation wall 61 is in the form of a plate, and is disposed in a plane in which the surface 26e lies, and this first limitation wall 61 partially closes an opening of the receiving recess 60 open to the surface 26e. More specifically, this first limitation wall 61 closes that portion of this opening disposed at the inner side of the body 2 (in FIG. 1) and disposed adjacent to the surface 26a. The first limitation wall 61 of this construction prevents the shaft portion 72, located or received in the receiving recess 60, from being disengaged from the receiving recess 60 through the above opening during the rotative movement of the rotation portion 7.

The second limitation wall 62 is in the form of a plate, and is disposed in a plane in which the surface 26a lies, and this second limitation wall 62 partially closes an opening of the receiving recess 60 open to the surface 26a. More specifically, this second limitation wall 62 closes that portion of this opening disposed at the inner side of the body 2 (in FIG. 1). The second limitation wall 62 of this construction prevents the shaft portion 72, received in the receiving recess 60, from being disengaged from the receiving recess 60 through the above opening during the rotative movement of the rotation portion 7.

Further, in order to absorb a relative slight movement (shaking movement) between the ECU 3 and the body 2, a rib 73 is formed on the shaft portion 72, while ribs 63 are formed on the second limitation wall 62, as shown in FIGS. 9 to 14.

The rib 73 formed on the shaft portion 72 projects from the outer surface of this shaft portion 72, and extends straight along an axis of the shaft portion 72 (that is, along an axis of rotation (angular movement) of the shaft portion 72). Namely, the rib 73 extends from the vicinity of the shaft leg 71 to a distal end portion of the shaft portion 72 remote from the shaft leg 71. Only one rib 73 is formed on the upper side (upper surface) of the shaft portion 72 disposed farther from the plane of the lower wall 3b and closest to the plane of the upper wall 3a.

The ribs 63 formed on the second limitation wall 62 project from an inner surface of this second limitation wall 62 toward the mounting surface portion 2a, and extend straight in such a direction that when the shaft portion 72 is received in the receiving recess 60, the ribs 63 perpendicularly intersect the rib 73. There are provided the two ribs 63 which are disposed in parallel spaced relation to each other.

Figure 3:
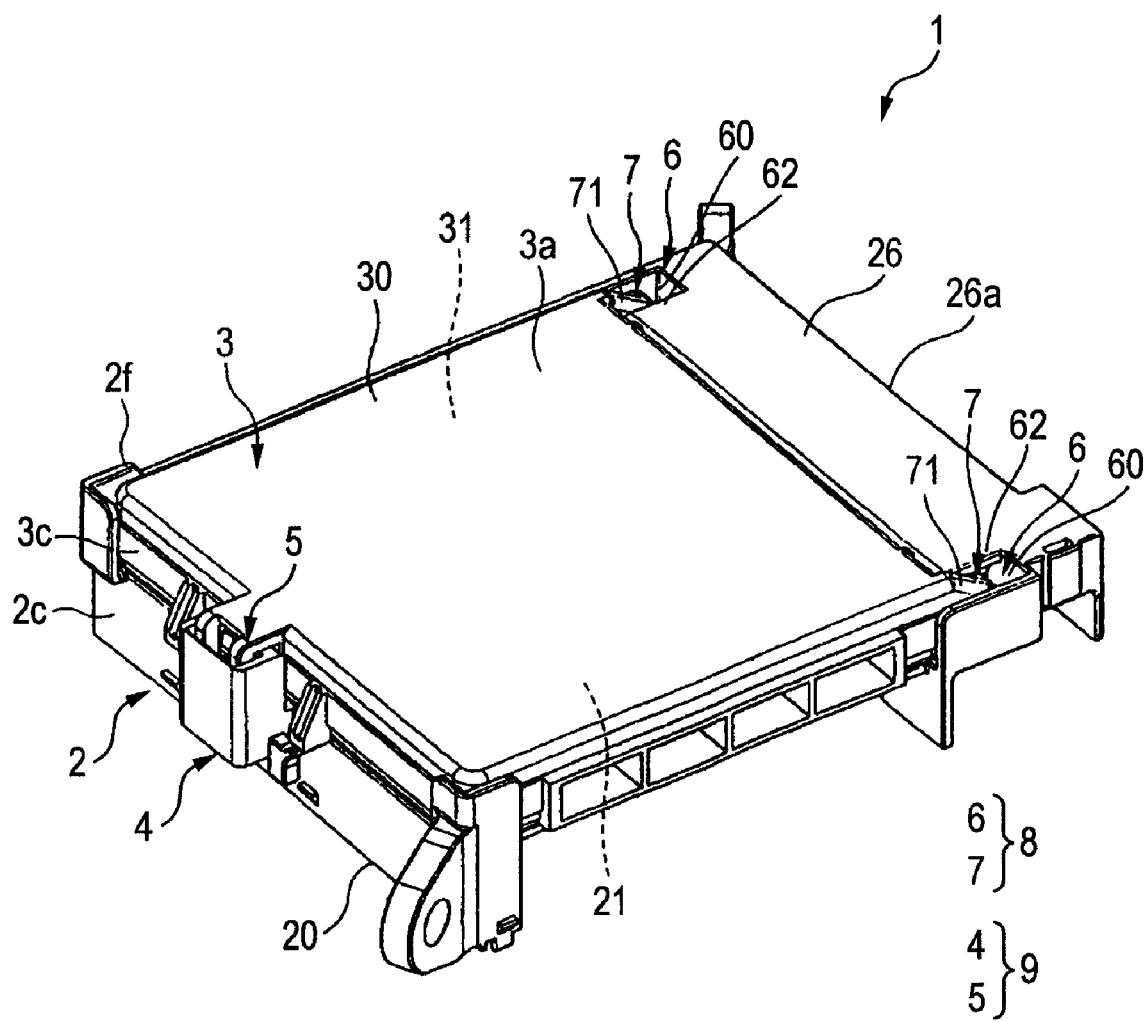
FIG. 3 is a perspective view showing a condition in which the mounting member of FIG. 2 is attached to the body.
Figure 4:
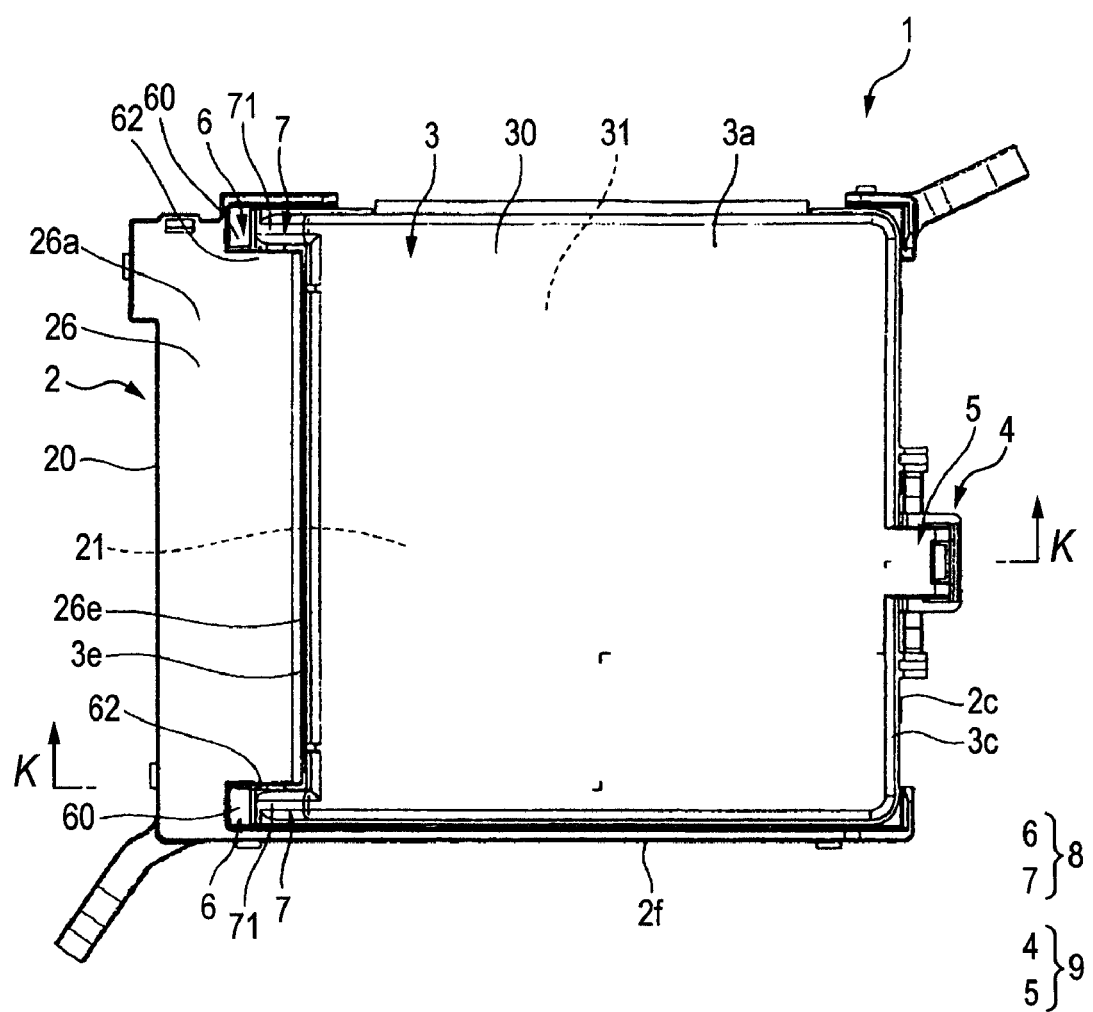
FIG. 4 is a front-elevational view of the electrical connection box of FIG. 3.
Figure 13:
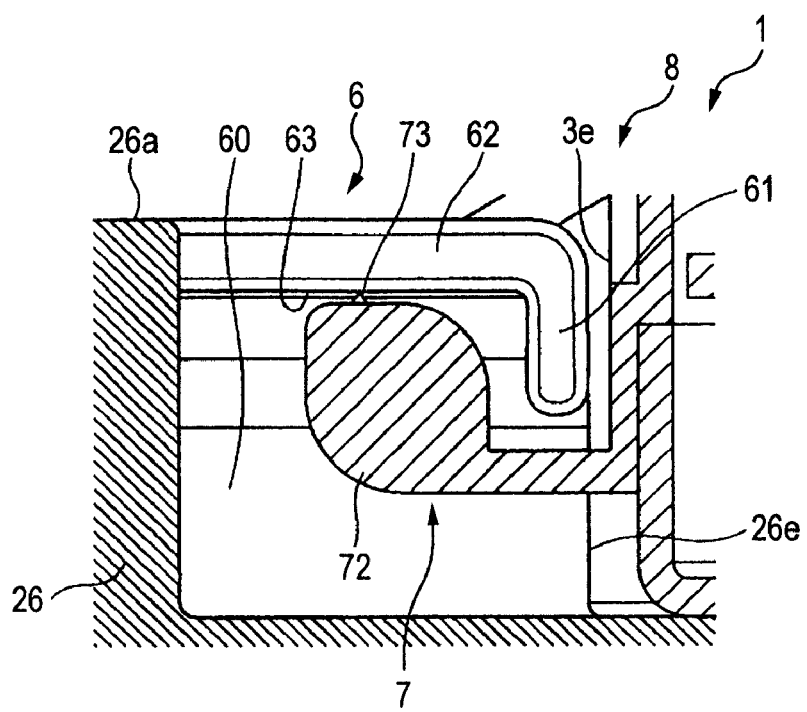
FIG. 13 is an enlarged cross-sectional view of a portion F of the electrical connection box shown in FIG. 8.
Figure 14:
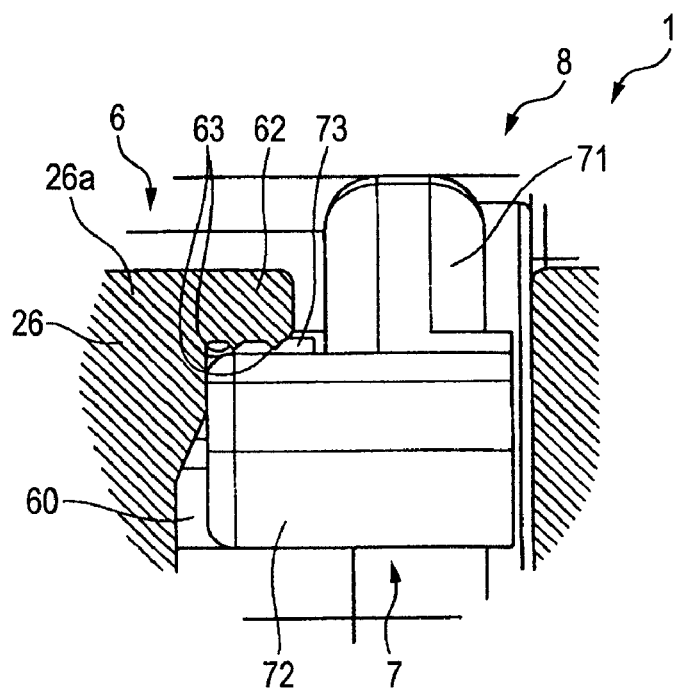
FIG. 14 is a cross-sectional view taken along the line E-E of FIG. 8.

The rib 73 and the ribs 63 bite into each other simultaneously when the ECU 3 is attached to the body 2 (This condition is shown in FIG. 3) as shown in FIGS. 13 and 14. Namely, the rib 73 and the ribs 63 abut against each other. At this time, the rib 73 and the ribs 63 abut against each other in perpendicularly-intersecting relation, and bite into each other to be fixed to each other. Therefore, the shaking of the ECU 3 and the body 2 relative to each other in the direction of projecting of the ribs 73 and 63 (that is, the shaking in the direction of superposition of the ECU 3 on the body 2) is prevented, and in addition the shaking of the ECU 3 and the body 2 relative to each other in the longitudinal direction of the rib 73 and also in the longitudinal direction of the ribs 63 (that is, the shaking in the direction of opposing of the side walls 3d and 3f to each other as well as the shaking in the direction of opposing of the side walls 3c and 3e to each other) can be prevented. Furthermore, the rib 73 and the ribs 63 are so disposed as to abut against each other simultaneously when the ECU 3 is attached to the body 2, and therefore these ribs 73 and 63 will not prevent the rotation of the shaft portion 72.

The fixing portion 9 includes a lock arm 5 formed on and extending from the side wall 3c, and a lock 4 formed on the upstanding wall 2c so as to be engaged with the lock arm 5. Simultaneously when the lower wall 3b of the ECU 3 abuts against the mounting surface portion 2a of the body 2, the lock arm 5 and the lock 4 are engaged with each other, thereby fixing the ECU 3 and the body 2 to each other.

Figure 11:
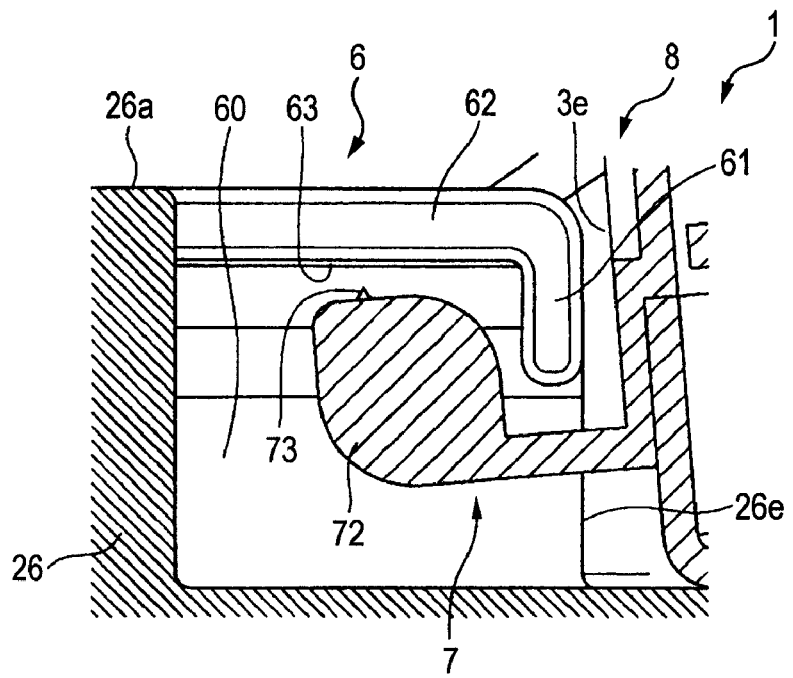
FIG. 11 is an enlarged cross-sectional view of a portion D of the electrical connection box shown in FIG. 7.
Figure 12:
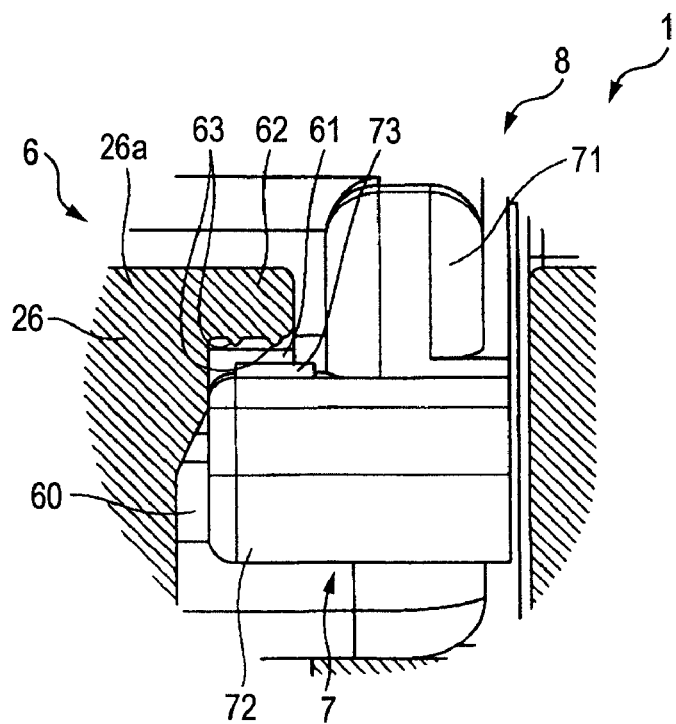
FIG. 12 is a cross-sectional view taken along the line C-C of FIG. 7.

In the electrical connection box 1 of the above construction, each shaft portion 72 is slid over the mounting surface portion 2a toward the inner end of the corresponding receiving recess 60, with the ECU 3 kept inclined relative to the mounting surface portion 2a as shown in FIGS. 2, 6, 9 and 10, and as a result the rotation portions 7 are located or received respectively in the receiving recesses 60. The rotation portions 7 are inserted respectively into the receiving recesses 60 until the side wall 3e of the ECU 3 is brought into abutting engagement with the first limitation walls 61, and in this condition the ECU 3 is rotatably moved about the shaft portions 72 in such a manner that the other end (that is, the side wall 3c) of the ECU 3 is moved toward the mounting surface portion 2a as shown in FIGS. 7, 11 and 12. As a result, the lower wall 3b of the ECU 3 is superposed on the mounting surface portion 2a, and also the lock arm 5 is engaged with the lock 4, thereby fixing the ECU 3 to the body 2 as shown in FIG. 8. Namely, the ECU 3 is attached to the body 2. In this condition, each shaft portion 72 is prevented by the first and second limitation walls 61 and 62 from being disengaged from the receiving recess 60. And besides, simultaneously when the ECU 3 is attached to the body 2, the rib 73 and the ribs 63 abut against each other, thereby preventing a relative shaking movement between the ECU 3 and the body 2. Furthermore, simultaneously when the ECU 3 is attached to the body 2, the connectors 24 and 34 are fitted together, so that the printed circuit boards 21 and 31 are electrically connected together.

The electrical connection box 1 of this embodiment includes the hinges 8, and the fixing portion 9, and therefore the shaft portions 72 are located respectively in the receiving recesses 60, and then the ECU 3 is rotatably moved toward the body 2 about these shaft portions 72, and merely by doing so, the ECU 3 can be easily attached to the body 2. Namely, it is not necessary to precisely position the ECU 3, and also it is not necessary to fix the ECU 3 to the body 2 by separate parts such as screws, and therefore the ECU 3 can be quite easily mounted on the base 2.

Furthermore, the electrical connection box 1 has the ribs 73 and 63, and therefore a relative shaking movement between the ECU and the body 2 can be prevented after the ECU 3 is attached to the body 2. Furthermore, since such shaking movement can be prevented, a clearance to be formed between the body 2 and the ECU 3 so as to enhance the efficiency of the attaching operation can be set to a larger size, and therefore the ECU 3 can be more easily attached to the body 2. Furthermore, the plurality of ribs 63 are provided, and therefore the shaking movement can be more positively prevented.

Furthermore, the rib 73 and the ribs 63 bite into each other in perpendicularly-intersecting relation, and are fixed to each other. Therefore, the shaking of the ECU 3 and the body 2 relative to each other in the direction of projecting of the ribs 73 and 63 (that is, the shaking in the direction of superposition of the ECU 3 on the body 2) is prevented, and in addition the shaking of the ECU 3 and the body 2 relative to each other in the longitudinal direction of the rib 73 and also in the longitudinal direction of the ribs 63 (that is, the shaking in the direction of opposing of the side walls 3d and 3f to each other as well as the shaking in the direction of opposing of the side walls 3c and 3e to each other) can be prevented.

Furthermore, the rib 73 and the ribs 63 are so disposed as to abut against each other simultaneously when the ECU 3 is attached to the body 2, and therefore these ribs 73 and 63 will not prevent the rotation of the shaft portion 72. Namely, the ECU 3 can be easily attached to the body 2 without producing a frictional resistance.

Furthermore, in the electrical connection box 1, a relative shaking movement between the ECU 3 and the body 2 can be positively prevented as described above, and therefore wear of the terminals 22 and 32 of the connectors 24 and 34 can be prevented, and also the reliability of connection between the terminals 22 and the terminals 32 and hence the reliability of connection between the printed circuit boards 21 and 31 can be secured.

In the above embodiment, although the ECU 3 is used as the mounting member, the mounting member is not limited to such ECU, and any other mounting member such as a case, a part, etc., can be used in so far as it can be attached to the body 2. In the invention, each of the body and the mounting member does not always need to have the printed circuit board and the connector.

In the above embodiment, although the ribs 73 and 63 are formed on the shaft portion 72 and the shaft receiving portion 6, the rib (or ribs) may be formed on at least one of the shaft portion 72 and the shaft receiving portion 6. The number of the ribs 63 formed on the shaft receiving portion 6 may be one, and also a plurality of ribs 73 may be formed on the shaft portion 72.

In the invention, although the rib 73 formed on the shaft portion 72 and the ribs 63 formed on the shaft receiving portion 6 are most preferably arranged to perpendicularly intersect each other, the rib 73 and the ribs 63 may be arranged to intersect each other. Furthermore, the rib 73 and the ribs 63 do not always need to abut against each other, and for example the rib 73 may abut against the second limitation wall 62.

The above embodiment merely shows a representative form of the present invention, and the present invention is not limited to the above embodiment. Namely, the invention can be modified in various ways without departing from the subject matter of the invention.

What is claimed is:

1. An electrical connection box, comprising:
   a body;
   a mounting member which is attached to the body;
   a shaft portion which is provided on the mounting member; and
   a shaft receiving portion which is provided on the body and receives the shaft portion rotatably,
   wherein a first rib is formed on one of the shaft portion and the shaft receiving portion; and
   wherein when the mounting member is attached to the body, the first rib abuts against the other of the shaft portion and the shaft receiving portion.

2. The electrical connection box according to claim 1, wherein the first rib is formed on the shaft portion; and
   wherein a second rib is formed on the shaft receiving portion.

3. The electrical connection box according to claim 2, wherein the first rib extends along a surface of the shaft portion;
   wherein the second rib extends along a surface of the shaft receiving portion; and
   wherein the first rib and the second rib intersect with each other when the mounting member is attached to the body.

4. The electrical connection box according to claim 2, wherein the first rib extends along an axis of rotation of the shaft portion.

* * * * *